US009426825B2

(12) United States Patent
Galtier et al.

(10) Patent No.: US 9,426,825 B2
(45) Date of Patent: Aug. 23, 2016

(54) METHOD AND A DEVICE FOR REGULATING TRANSMISSION IN A WIRELESS TELECOMMUNICATIONS NETWORK

(75) Inventors: Jérôme Galtier, Nice (FR); Patrick Brown, Cagnes sur Mer (FR)

(73) Assignee: FRANCE TELECOM, Paris (FR)

( * ) Notice: Subject to any disclaimer, the term of this patent is extended or adjusted under 35 U.S.C. 154(b) by 571 days.

(21) Appl. No.: 13/519,090

(22) PCT Filed: Dec. 22, 2010

(86) PCT No.: PCT/FR2010/052878
§ 371 (c)(1),
(2), (4) Date: Aug. 14, 2012

(87) PCT Pub. No.: WO2011/077047
PCT Pub. Date: Jun. 30, 2011

(65) Prior Publication Data
US 2012/0300723 A1 Nov. 29, 2012

(30) Foreign Application Priority Data

Dec. 24, 2009 (FR) ...................................... 09 59577

(51) Int. Cl.
*H04W 74/08* (2009.01)
(52) U.S. Cl.
CPC ..................................... *H04W 74/08* (2013.01)
(58) Field of Classification Search
CPC . H04W 88/06; H04W 72/1215; H04W 28/22; H04W 76/04; H04L 1/0002
See application file for complete search history.

(56) References Cited

U.S. PATENT DOCUMENTS

| 7,839,884 | B2 | 11/2010 | Galtier |
| 2002/0039349 | A1* | 4/2002 | Malaney et al. ........... 370/230.1 |
| 2009/0109993 | A1* | 4/2009 | Galtier ........................ 370/462 |
| 2010/0322220 | A1 | 12/2010 | Brown et al. |
| 2011/0289232 | A1* | 11/2011 | Douceur et al. .............. 709/233 |

FOREIGN PATENT DOCUMENTS

| WO | 2007051946 A1 | 5/2004 |
| WO | 2005119986 A1 | 12/2005 |
| WO | 2009095628 A1 | 8/2009 |

OTHER PUBLICATIONS

International Preliminary Report on Patentability and English translation of the Written Opinion dated Aug. 7, 2012 for corresponding International Application No. PCT/FR2010/052878, filed Dec. 22, 2010.

(Continued)

*Primary Examiner* — Jung Park
(74) *Attorney, Agent, or Firm* — David D. Brush; Westman, Champlin & Koehler, P.A.

(57) ABSTRACT

A method and apparatus are provided for regulating transmissions according to a tournament method, implemented by a station having at least one data packet to be transmitted via a wireless communication network having a predetermined bandwidth. The method includes a step during which the station determines whether or not to participate in a tournament, the likelihood of a station participating in a tournament depending on the predetermined bandwidth. Specifically, the likelihood of a station participating in a tournament is selected to be higher as the predetermined bandwidth gets higher.

21 Claims, 3 Drawing Sheets (56) References Cited

OTHER PUBLICATIONS

International Search Report and Written Opinion dated Mar. 17, 2011 for corresponding International Application No. PCT/FR2010/052878, filed Dec. 22, 2010.

Galtier, "Analysis and optimization of mac with constant size congestion window for WLAN", Proceedings of the Third International Conference on Services and Networks Communications, INRIA, Library of Congress No. 2007930108, Aug. 2007.

Abichar et al., "CONTI: constant time contention resolution for WLAN access", IFIP Networking 2005.

IEEE 802.11a 1999, IEEE 802.11b 1999, IEEE 802.11d 2001, Part 11: Wireless LAN medium access control (MAC) and physical layer (PHY) specifications, specifically section 9.2, pp. 75-77, section 9.3, pp. 91-92.

* cited by examiner

METHOD AND A DEVICE FOR REGULATING TRANSMISSION IN A WIRELESS TELECOMMUNICATIONS NETWORK

CROSS-REFERENCE TO RELATED APPLICATIONS

This Application is a Section 371 National Stage Application of International Application No. PCT/FR2010/052878, filed Dec. 22, 2010, which is incorporated by reference in its entirety and published as WO 2011/077047 on Jun. 30, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of wireless telecommunications networks, in particular wireless local networks (WLAN) in compliance with the IEEE 802.11 family of standards.

Such networks are also known as WiFi networks. In numerous applications they are used for establishing a network between stations (e.g. computers, personal digital assistants, and peripherals).

BACKGROUND OF THE DISCLOSURE

In the document "IEEE 802.11a-1999, IEEE 802.11b-1999, IEEE 802.11d-2001, Part 11: Wireless LAN medium access control (MAC) and physical layer (PHY) specifications", the 802.11 standard defines a method of regulating traffic in the wireless network. That method makes use of a system of congestion windows (CW) for regulating the traffic. According to that standard, in order to determine the instant at which a data packet is to be transmitted, a station draws a random number between 0 and CW-1, the value of CW being an integer lying in the interval of values $CW_{min}$ to $CW_{max}$ as specified by the 802.11 standard.

The value for CW is used to launch a countdown for transmission of the packet, with the counting being deferred if the station observes that some other station is already transmitting. Unfortunately, that congestion window system leads to a large number of collisions on the wireless network that, from the point of view of a user, are equivalent to a large loss of bandwidth.

Another method known as the "tournament mechanism" is suitable for being used by the various stations in order to regulate the transmission of packets and limit the collision rate. The tournament mechanism is described in the document by Z. Abichar and M. Chang, entitled "CONTI: constant time contention resolution for WLAN access", IFIP Networking 2005.

The tournament mechanism consists in organizing a kind of tournament between the stations that have packets for transmission. A transmission is made up of a certain number of selection rounds, each executed during a time interval of predefined duration that enables each station to have sufficient time to hear transmission by any other station. This duration is typically equal to the duration of the time interval known as the "SlotTime" that, in the IEEE 802.11 standard, is defined as the elementary time interval in the procedure for resolving contention by congestion windows.

A tournament operates as follows. At the beginning of the tournament, all of the stations having packets for transmission have the possibility of being authorized to transmit their respective packets. On each selection round, one or more stations are liable to be deleted from the list of stations that are authorized to transmit, depending on whether or not they are allocated an authorization to transmit during the selection round in question. At the end of the tournament, only those stations that have not been eliminated are authorized to transmit. If a plurality of stations are still in the running, they transmit simultaneously, thereby giving rise to a collision and thus to disturbed reception, with it being impossible to receive the transmitted data packets correctly. Those stations then need to participate in the following tournament in an attempt to transmit their packets once again.

When transmitting a data stream that requires priority access to the network or that requires a wide passband, a solution for regulating transmission that makes it possible to guarantee a certain level of performance in terms of bandwidth or data rate and also in terms of quality of service, is described in the patent document published under the No. WO 2009/095628.

That document describes a mechanism for sharing access to the network fairly between the various user stations, which mechanism makes it possible to manage coexistence between a plurality of classes of packets. That mechanism takes account of the class to which a packet belongs in order to determine how transmission authorizations or prohibitions should be allocated during a tournament. That mechanism makes it possible to control the probability with which a station transmits a packet on a class-by-class basis. In particular, it is possible to give preference to one class of packet over another, and thus to set up a method of managing priorities between classes. In that way, the method may be adapted to each class of packet depending on the needs specific to a class.

Nevertheless, the inventors have found that those implementations of the tournament mechanism do not provide sufficient performance when a given tournament involves stations that are to transmit packets at different data rates. It is entirely possible for the various stations participating in a given tournament to be implementing different standards of the 802.11 family (e.g. 802.11b, 802.11g, 802.11n, etc.). Consequently, it is possible for a first station to transmit with a mean data rate of 1 megabit per second (Mbit/s), while another station transmits with a mean data rate of 11 Mbit/s.

Given the way in which tournaments are organized, the mean data rate of the system comprising all of the stations participating in a tournament will be the lowest of the packet data rates to be transmitted by the various stations. Consequently, stations that are capable of transmitting at a rate greater than that determined for the packets to be transmitted by other stations are penalized by the presence of those other stations in the tournament.

Furthermore, for any given station, the rate with which a set of packets ought to be transmitted may vary over time. It is therefore not possible to know in advance the respective needs of the stations participating in a tournament.

There is thus a need to adapt the tournament mechanism dynamically to the data rates of the packets for transmission by the various stations.

SUMMARY

Thus, in a first aspect, an embodiment of the invention provides a regulation method for regulating transmission using the tournament mechanism and implemented by a station having at least one data packet for transmission via a wireless communications network at a determined data rate, the method comprising a step during which the station determines whether or not it is participating in a tournament, with the probability with which a station participates in a tournament being a function of said determined data rate.

An embodiment of the invention seeks to control the frequency with which a station participates in a tournament, e.g. so that the stations having the highest transmission data rate can access the network more frequently.

In an implementation, the probability with which a station participates in a tournament increases with an increase in said determined data rate.

These stations no longer have their performance limited as a result of a limited number of accesses, equal to that of the other stations, as imposed by known mechanisms. An embodiment of the invention thus shares access time to the network more fairly for fast stations and thus achieves more efficient use of the network.

The overall performance measured on the basis of the overall data rate for a set of stations can be improved by a factor of the same order of magnitude as the ratio between the highest transmission data rates and the lowest transmission data rate. For example, by a factor of about 10 if there is a first station having a mean data rate of 1 Mbit/s and another station with a mean data rate of 11 Mbit/s.

In an embodiment, the probability is also a function of other parameters that are characteristic of said packet for transmission. By way of example, this parameter may be the size of the packet or the traffic class of the packet. It is thus possible to increase the frequency of access to the radio medium for certain packets on the basis of a given criterion, depending on parameters selected for the calculation function that is used.

In an implementation, the probability with which a station participates in a tournament is equal to 1 when said determined rate is greater than a mean data rate value ($Q_{moy}$) estimated for all of the stations that emitted a packet during preceding tournaments. In this way, it is possible to identify in simple manner the stations that are selected for participating in the tournament on the basis of a simple comparison between two data rate values. Furthermore, since the estimated mean data rate value is selected as the reference value for comparison purposes, the number of stations participating in a tournament is automatically adapted in dynamic manner.

In an implementation, at the beginning of a tournament, the station obtains an index value A from which the station determines the probability values that are allocated thereto for the various rounds of the tournament; and the station participates in a tournament if the index value it has obtained lies in the interval $[1-1/Q_{moy}; 1[$ where $Q_{moy}$ is a mean data rate value estimated for all of the stations that emitted a packet during preceding tournaments. An embodiment of the invention conserves the mechanism of drawing the index value that serves to obtain a random statistic distribution of index values A as drawn, and it proposes a simple method of selecting the stations that participate in a tournament on the basis of this index value alone.

In an implementation, when the station participates in a tournament, the station weights the index value A by the ratio $Q_{moy}$ in the following manner:

$$A' = 1 - Q_{moy}(1-A)$$

where the weighted index value A' is used instead of the value A in order to determine the probability values that are allocated to the station. This serves, in very simple manner, to guarantee that there is a random statistic distribution in the entire interval $[0,1[$ of index values A' used for calculating the values that represent transmission authorizations and/or prohibitions, with this applying even though some stations do not participate in the tournament.

An embodiment of the invention also provides a data medium that is readable by computer or by a data processor, and that includes the instructions of a program as specified above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed by an electrical or optical cable, by radio, or by other means. The program of an embodiment of the invention may in particular be downloaded from an Internet type network.

Alternatively, the data medium may be an integrated circuit in which the program is incorporated, the circuit being adapted to execute or to be used in the execution of the method in question.

In a second aspect, an embodiment of the invention also provides a station having at least one data packet for transmission via a wireless communications network at a determined data rate, the station having means for determining whether or not it participates in a tournament, the probability with which a station participates in a tournament being a function of said determined data rate.

The station of an embodiment of the invention has means for implementing the steps of a method of an embodiment of the invention, in particular a data processor and a software and/or hardware component for implementing the steps.

In another implementation, an embodiment of the invention is implemented by software and/or hardware components. In this context, the term "module" may correspond in this document equally well to a software component or to a hardware component. A software component corresponds to one or more computer programs, one or more subprograms of a program, or more generally to any program element designed to implement a function or a set of functions. A hardware component comprises any element of hardware designed to implement a function or a set of functions.

BRIEF DESCRIPTION OF THE DRAWINGS

Other objects, characteristics, and advantages appear from the following description given solely by way of non-limiting example and made with reference to the accompanying drawings, in which:

FIG. 5 shows a first probability tree illustrating the implementation of a transmission regulation method of an embodiment of the invention.

DETAILED DESCRIPTION OF ILLUSTRATIVE EMBODIMENTS

Figure 1:
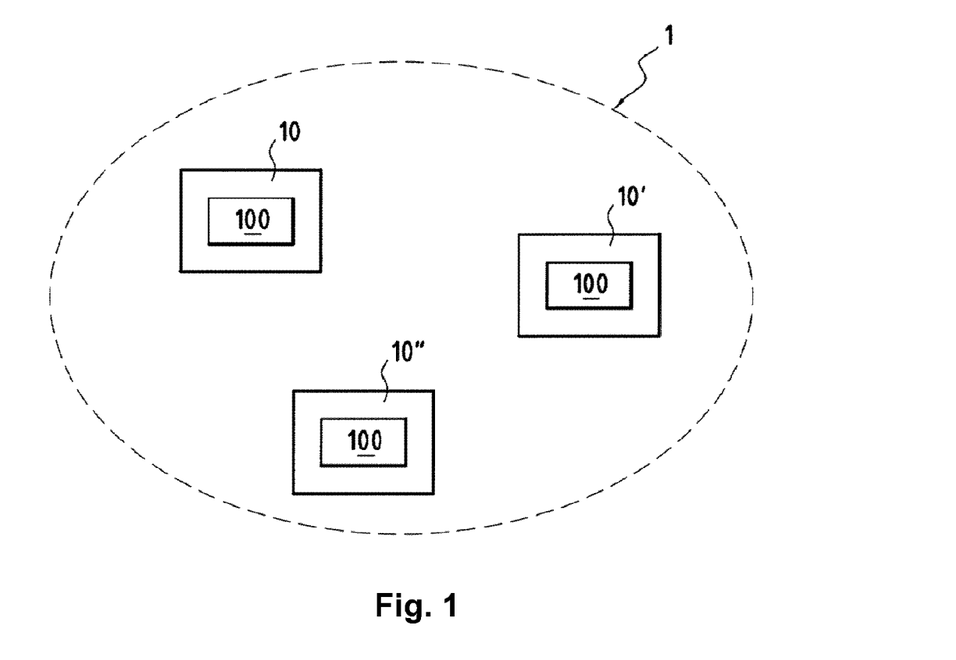
FIG. 1 shows a wireless telecommunications network with stations in accordance with the invention in a preferred embodiment.

FIG. 1 shows a wireless telecommunications network 1 in which stations 10, 10', 10" in accordance with an embodiment of the invention are free to move. Each of these stations 10, 10', 10" includes a transmission regulation device 100 in accordance with an embodiment of the invention.

Figure 2:
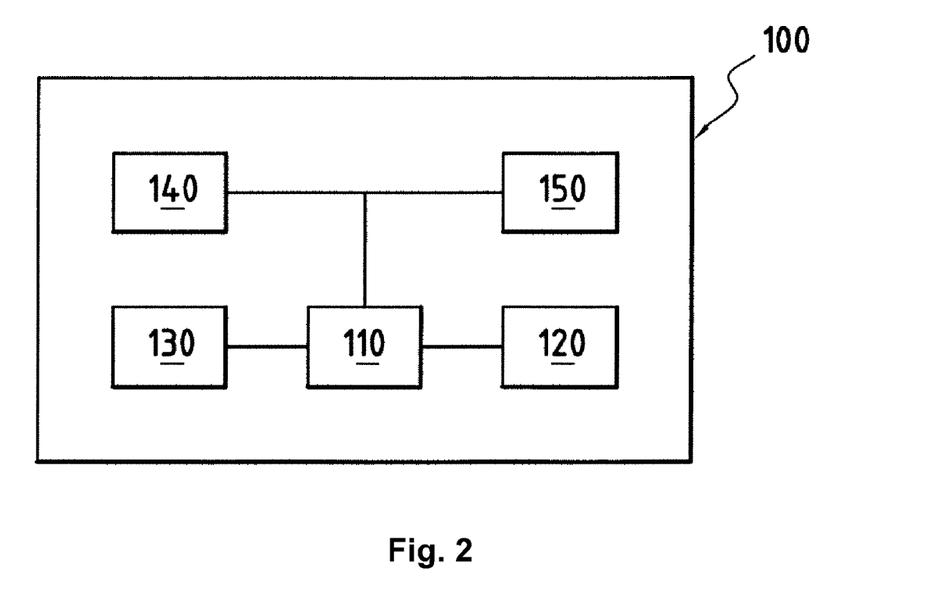
FIG. 2 shows a transmission regulation device in accordance with the invention in a preferred embodiment.

In the embodiment shown in FIG. 2, the device 100 of an embodiment of the invention comprises a processor 110, random access memory (RAM) 120, a read-only memory 130, a module 140 for accessing the network 1 in order to transmit and receive packets and signals over the wireless telecommunications network 1, and a probability table 150. These various elements are connected together by a bus system that is not given a reference. In the presently-described example, the means 140 for sending and receiving data packets and signals over the wireless telecommunications network 1 are constituted by a card giving access to the network 1 and complying with the IEEE 802.11 family of standards.

In order to implement the method, use is made of the tournament mechanism mentioned in the introduction.

In the tournament mechanism, as described by CONTI in the above-referenced document, the authorizations or prohibitions to transmit are allocated to the station by using binary random variables having a Bernoulli distribution. This distribution is defined by a probability of drawing authorization to transmit. Such a probability is thus allocated to each station on each round of selection. The probabilities are preferably selected in such a manner that the collision rate is statistically as low as possible. One procedure for selecting probabilities in optimum manner is described in the document "Analysis and optimization of mac with constant size congestion window for WLAN" by J. Galtier, Proceedings of the Third International Conference on Services and Networks Communications, INRIA, Library of Congress Number 2007930108, August 2007.

In a particular embodiment, described in patent document WO 2007/051946, the probabilities allocated to the various stations during a selection round may be a function of the transmission authorizations or prohibitions drawn during the preceding selection rounds, in such a manner as to minimize the collision rate.

Each of the stations 10, 10', 10" has a transmission management module that serves to implement a transmission regulation method.

In the description below, the following notation is used:

k is the index identifying the current selection round of a tournament;

$k_{max}$ is the maximum number of selection rounds for a tournament;

r is a binary random variable; and r(k) is the value of the binary random value r drawn during the selection round of index k; r(k) belongs to the set {0,1}, the value "1" usually representing an authorization to transmit, while the value "0" represents a prohibition to transmit.

The main steps G10 to G100 of a transmission regulation method in accordance with the mechanism described in patent document WO 2009/095628 are summarized below and shown in FIG. 3. The reader may refer to that document for more detail on the mathematical foundations and on the performance of that mechanism.

The method is implemented by the transmission management module of a station having a data packet for transmitting over the network 1. All stations that have a data packet for transmitting implement the same method simultaneously without any mutual interrogation or concertation being needed between these stations, other than that which is described in the steps described below.

The method is described for a station 10. It corresponds to a so-called "tournament": it is repeated by each station so long as it has packets to be transmitted. Stations having packets that are to be transmitted all act at the same instant to launch the procedure for resolving contention by implementing a tournament, this instant being a function of a criterion analogous to that used for the congestion window system in the IEEE 802.11 standard, i.e. after a predefined period of time DIFS1 (which need not be the same as the DCF Inter Frame Space (DIFS) time defined in the 802.11 standard).

It is assumed here that the class n allocated to a packet is coded by an integer value lying in a interval of values $[N_{min}, N_{max}]$, e.g. [1, 8].

It is also assumed that, at the beginning of a tournament, each station having packets for transmission has knowledge of a sequence of subintervals $[A_n^i, A_n^{i+1}[$ associated with the packet class n to which the packets for transmission of this station belong. It should be observed that the sequence of subintervals $[A_n^i, A_n^{i+1}[$ used by a station during a tournament may vary from one tournament to another, in particular if a round robin or weighted round robin type mechanism is used between packet classes. These situations are described in detail in patent document WO 2009/095628.

During a first step G10, the station 10 initializes a variable k to the value 1, this variable representing the index of the current selection round. During this same step, each station having a packet for transmission determines a sequence of k probability values r(1) to r(k) that are allocated thereto for the tournament. These values r(1) to r(k) are stored in memory by the station.

The k probability values r(1) to r(k) are determined as follows: during this same step G10, each station having a packet for transmission determines an index value A representative of the behavior of the station during the tournament, which value is obtained by drawing a value of a universal random variable taking its values over the interval of values [0, 1[, or it is deduced from an index value A as used during a preceding tournament. More precisely, this index value A represents the probability that the station 10 will be authorized to transmit a packet at the end of the tournament.

Let Z be the total number of leaf nodes of the probability tree associated with the tournament as described in patent document WO 2009/095628. For each packet class n that is to be processed, there is defined a sequence of Z+1 index values $A_n^i$ lying in the interval of real values [0,1[ for $0 \leq i \leq Z$, with $A_n^0 = 0$ and $A_n^Z = 1$. These index values $A_n^i$, for $0 \leq i \leq Z$, thus define a partition of the interval of real values [0,1[ into Z disjoint subintervals $[A_n^i, A_n^{i+1}[$.

The station determines the subinterval $[A_n^i, A_n^{i+1}[$ in which the index value that has been drawn lies by comparing A with the various values $A_n^i$ for $0 \leq i \leq Z$, where Z represents the total number of leaf nodes of the probability tree used. For this purpose, the predefined values $A_n^i$ are preferably stored each in association with the sequence of values r(1) to r(k) associated with each subinterval $[A_n^i, A_n^{i+1}[$, these values representing authorizations or prohibitions to emit that are allocated to the station for the k rounds of the current tournament.

When in the presence of stations having data packets for transmission that belong to different classes, a station having a data packet for transmission that belongs to a class that is to be processed with priority is required to use as probabilities a set of probabilities that guarantee it will end up in the state represented by the leaf nodes that are the furthest to the right in the tree. This station will win the tournament against another station using as its probability a set of probabilities that guarantee it will end up in the leaves furthest to the left in the probability tree.

The values r(k) are thus determined from a single initial index value A: this makes it possible to avoid drawing a value r(k) on each round of the tournament, since the values can be deduced directly from the index value A drawn at the beginning, while still guaranteeing that the chances of transmitting are distributed among the stations in the same manner as would be achieved by actually drawing values based on the probabilities $p_n^k(r(1), \ldots, r(k))$ allocated to the various nodes $N^k(r(1), \ldots, r(k))$.

In step G20, the station reads from memory the value r(k) associated with the current selection round.

This step G20 is followed by a step G30 during which it is verified whether the binary value r(k) obtained in step G20 is equal to "0".

If it is (transmitting prohibited), the test G30 is followed by a step G40 during which the station 10 listens to the wireless telecommunications network to determine whether another station 10', 10" has transmitted a signal indicating that that other station 10', 10" seeks to transmit a data packet.

If such a signal is detected (positive result for the test of step G50), then the method terminates in a step G60, without the station 10 transmitting its data packet. During the step G60, the station 10 waits for the end of the selection rounds and the possible transmission of a packet by some other station 10', 10" before once more executing the above-described initialization step G10.

In contrast, if in step G40 no signal is detected (negative result for the test of G50), this test is followed by a test in step G80 during which it is determined whether the round k is the last selection round, which amounts to verifying whether the variable k is equal to the value $k_{max}$. If it is, then the station 10 transmits its data packet during a step G100. As described in patent document WO 2009/095628, when all of the branches of the probability tree are not of the same length, the test of step G80 is replaced by a test that consists in verifying whether the node corresponding to the value r(k) is a leaf node.

In contrast, if k is strictly less than $k_{max}$, the result of the test in step G80 is negative. This step is then followed by a step G90 during which the value of the variable k is incremented by unity, in order to execute the following selection round.

If during the test of step G30, it is determined that the binary value that has been drawn is equal to the predetermined value 1 (authorization to transmit), the test G30 is followed by a step G70 of transmitting a signal indicating that the station 10 desires to transmit a data packet over the network.

This step G70 of transmitting a signal is followed by above-described step G80 during which it is verified whether the current selection round k is the last selection round. If it is, then the test G80 is followed by the step G100 of the station 10 transmitting the data packet. Otherwise, if it is not the last round, the test G80 is followed by the above-described incrementation step G90.

The incrementation step G90 is followed by new execution of the above-described steps G20 to G80, for the following selection round using the same logic for sequencing the steps as described above.

The method of an embodiment of the invention is described in greater detail with reference to FIG. 4. It is implemented by a station 10. In this method, an estimated mean data rate $q_{moy}$ is determined for all of the stations participating in a tournament. A ratio Q is also defined, which is the value of the mean data rate $q_{moy}$ divided by a minimum data rate value $q_{min}$ corresponding to the smallest current transmission data rate likely to be used for transmitting a packet by the stations participating in a given tournament:

$$Q_{moy} = \frac{q_{moy}}{q_{min}}$$

The ratio $Q_{moy}$ is thus a normalized mean data rate, i.e. its value always lies in the interval 0 to 1. When the method is initialized, the value for the mean data rate $Q_{moy}$ may be arbitrarily selected to be equal to 1, for example. Each station participating in a tournament stores this value for $Q_{moy}$ in memory and updates it at the end of each tournament.

Figure 4:
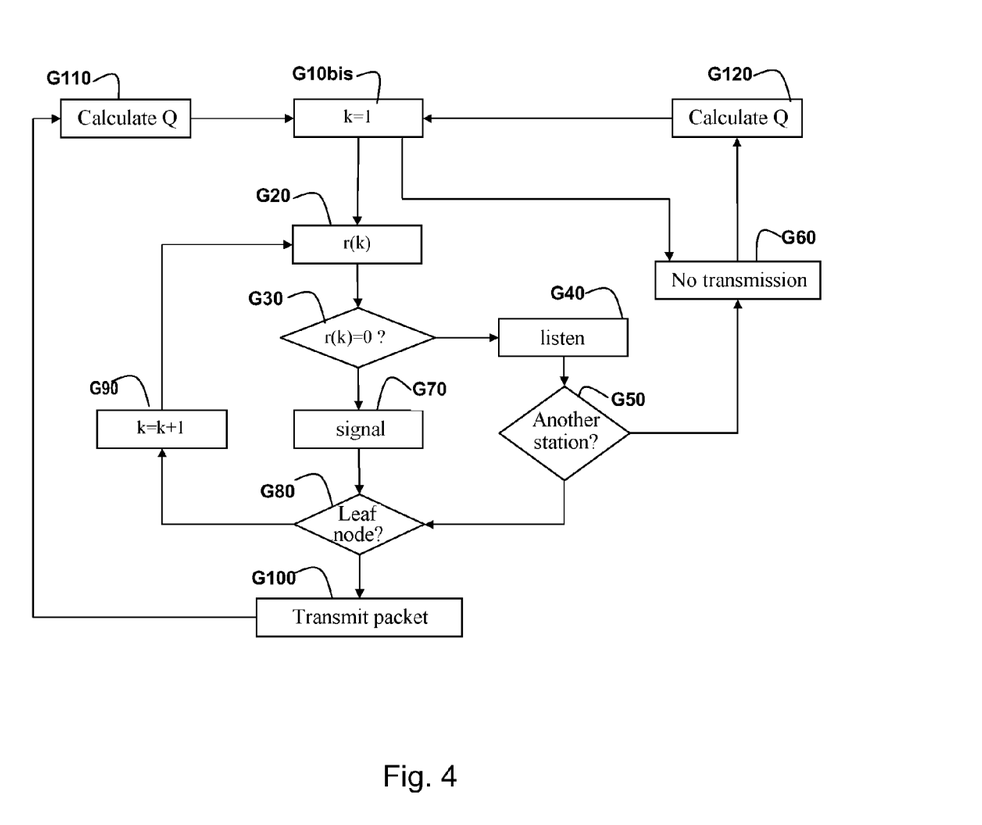
FIG. 4 is a flow chart showing the main step of a transmission regulation method in accordance with the invention in a preferred implementation.

FIG. 4 is a flow chart showing the various steps of an implementation of the method of an embodiment of the invention.

The steps G20 to G100 shown in FIG. 4 are identical to the steps G20 to G100 described above with reference to FIG. 3.

Figure 3:
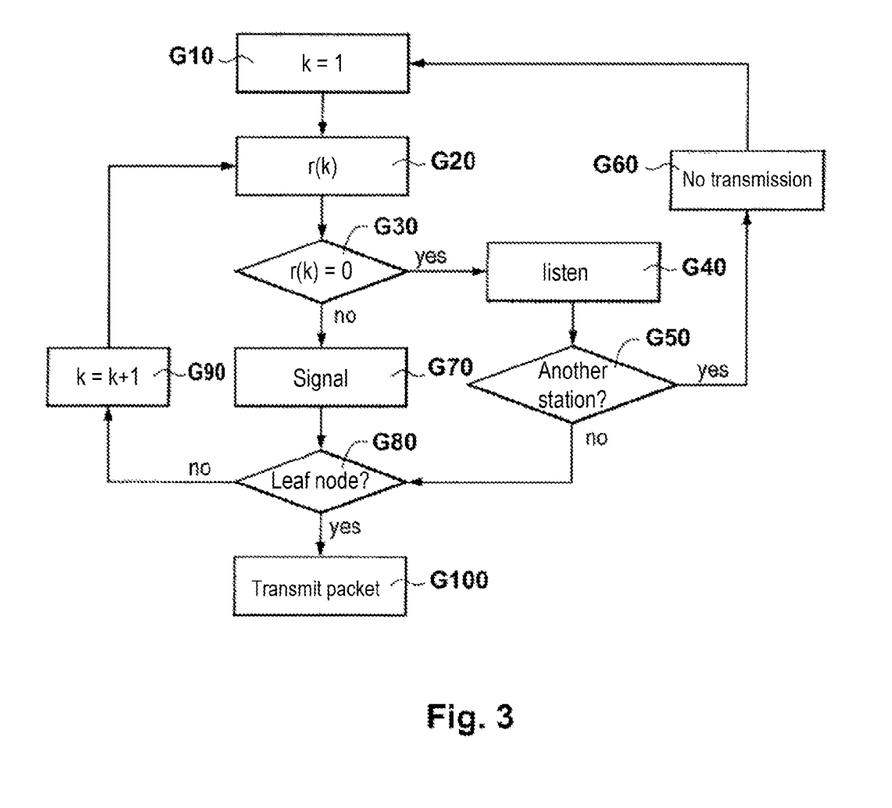
FIG. 3 is a flow chart showing the main steps of a transmission regulation method known in the prior art.

Nevertheless, the step G10 of FIG. 3 is replaced by a step G10bis in the method of an embodiment of the invention, during which step a weighted index value A' is used instead of the index value A for calculating the probability values during step G10, in the manner explained below.

During this step G10bis, the station obtains the index value A: it is either drawn at random in the interval $[1-1/Q_{cour}; 1/[$, or else deduced from a preceding index value A, where $Q_{cour}$ is the normalized value of the current data rate $q_{cour}$ with which the station under consideration is to transmit a packet:

$$Q_{cour} = \frac{q_{cour}}{q_{min}}$$

During this step G10bis, the station determines from the index value A whether or not it is to participate in a tournament. The station participates in the current tournament only if the value A that is obtained lies in the interval $[1-1/Q_{moy}; 1[$.

When the station does not participate in the tournament, two implementations are possible. In a first implementation, the step G60 is executed following the step G10bis. In a second implementation, the values r(1) to r(k) are all arbitrarily set to 0, and the station participates in the tournament with those values, thereby executing the steps G20, G30, G40, G50, G60, and G120 on each round of the tournament.

When the station does participate in the tournament, it uses a weighted index value A' determined using formula (2) below:

$$A' = 1 - Q_{moy} * (1-A) \quad (2)$$

in order to determine the subinterval $[A_n^i, A_n^{i+1}[$ in which the index value A' lies and in order to deduce therefrom the values r(1) to r(k) that are allocated thereto, in the same manner as that described when those values are deduced from the value A.

The step G20 is executed following the step G10bis with the probability values r(1) to r(k) as determined in this way. The other steps G30 to G100 follow on as described with reference to FIG. 3.

In step G110, identical to step G120 when after execution of a tournament during which a winning station has, in step G100, transmitted a packet at a transmit data rate $q_{emis}$, the station updates the value of the mean data rate $Q_{moy}$ from the normalized value $$Q_{emis} = \frac{q_{emis}}{q_{min}}$$

for the transmission data rate used, in such a manner that the value $Q_{moy}$ is a moving mean of the data rate used during the preceding tournaments for transmitting a packet.

The formula for calculating the mean may for example be:

$$Q_{moy} = Q_{mean}^{4/5} Q_{emis}^{1/5} \quad (5)$$

or indeed $$Q_{moy} = \sqrt[5]{Q_{emis_1} Q_{emis_2} Q_{emis_3} Q_{emis_4} Q_{emis_5}} \quad (6)$$

where $Q_{emis_1}$, $Q_{emis_2}$, $Q_{emis_3}$, $Q_{emis_4}$, and $Q_{emis_5}$, are normalized values of the packet transmission data rates $q_{emis_1}$, $q_{emis_2}$, $q_{emis_3}$, $q_{emis_4}$, and $q_{emis_5}$, used by the stations winning the five most recent tournaments. This method, or an equivalent filtering method, serves to avoid modifying the value of the ratio $Q_{moy}$ too quickly, where that could have the consequence of instability in the packet transmissions performed by the various stations.

When a station wins the tournament, it has knowledge of the transmission data rate $q_{emis}$. If this is not so, it listens to the radio channel and extracts information from the header of the transmitted packet in order to obtain the value for the transmission data rate $q_{emis}$.

However, in the event of a collision, it is not possible to have knowledge of a transmission data rate corresponding to a transmitted packet. Under such circumstances, the value of the mean data rate $Q_{moy}$ may for example be left unchanged or may be updated to have a value $$Q_{emis} = \frac{q_{emis}}{q_{min}}$$

on the basis of the transmission data rate used for the preceding collision-free sending of a packet.

At the end of step G110 (respectively G120), the station has a new data rate value $Q_{moy}$ with which it participates in the following tournament: the station executes a new tournament with the updated value for the ratio $Q_{moy}$, i.e. it performs step G10bis, and then continues with steps G20 to G100.

The looked-for aim is that the data rate value $Q_{moy}$ as updated during step G110 (respectively G120) by all of the stations participating in a tournament is known and shared by all of the stations without them having to transmit information about this value. Nevertheless, it is possible for the value that is calculated by any one station to differ from that calculated by the others (e.g. because it became connected to the network more recently than the other stations): the proposed calculation method makes it possible over time to smooth possible differences between stations. Such differences therefore do not have any substantial effect on the performance obtained by the method of an embodiment of the invention.

The index value A may be obtained in various ways: it may be drawn at random from the interval [0,1[, or it may be deduced from a preceding index value A, as described above.

For example, when implementing a round robin method between stations having packets of the same class n, the index value A used during a round robin stage is not, in fact, drawn at random, but is rather calculated from the index value A used during the preceding stage, as follows:

$$A = A + (A_n^i - 1)/Q_{moy} - 1/Q_{cour} \quad (3)$$

if the station wins the tournament, or else $$A = A + (A_n^1 - A)/Q_{moy} \quad (4)$$

where $[A_n^i, A_n^{i+1}[$ is the interval corresponding to the sequence of values r(1) ... r(k) allocated to the station winning the preceding tournament and where $Q_{cour}$ is the current value with which the station is to transmit a packet on the next tournament.

In an implementation, the value of $Q_{cour}$ (respectively of $Q_{emis}$) is a positive function of the characteristics of a packet for transmission (respectively of a transmitted packet), involving some or all of the following parameters:

the modulation speed of the signal (transmit data rate $q_{cour}$, a respectively $q_{emis}$);

the size of the packet; and/or the traffic class of the packet.

Preferably, the value $Q_{cour}$ (respectively $Q_{emis}$) is an increasing function of the modulation speed (transmit data rate $q_{cour}$, respectively $q_{emis}$).

By selecting the function for calculating the value $Q_{cour}$ (respectively $Q_{emis}$) in an appropriate manner, it is possible to increase the frequency of access to the radio medium for certain packets in application of a given criterion, depending on the parameters selected for the calculation function that is used.

Although the present disclosure has been described with reference to one or more examples, workers skilled in the art will recognize that changes may be made in form and detail without departing from the scope of the disclosure and/or the appended claims.

The invention claimed is:

1. A regulation method comprising:
    regulating a transmission using a tournament mechanism by a station having at least one data packet to transmit at a determined rate, via a wireless communications network, wherein regulating comprises:
        determining whether or not the station is participating in a tournament based on a probability with which the station participates in a tournament, wherein the probability is a function of said determined data rate, said determined data rate being independent of transmission authorizations or prohibitions allocated to the station during any preceding tournament; and
        transmitting the at least one data packet by the station on the wireless communications network at the determined rate, upon determination that the station participates in the tournament and is authorized to transmit the at least one data packet.

2. A method according to claim 1, wherein the probability with which the station participates in a tournament increases with an increase in said determined data rate.

3. A method according to claim 1, wherein the probability is also a function of another parameter that is characteristic of said packet to transmit.

4. A method according to claim 1, wherein the probability with which the station participates in a tournament is equal to 1 when said determined rate is greater than a mean data rate value $Q_{moy}$ estimated for all stations that emitted a packet during preceding tournaments.

5. A method according to claim 1, wherein:
    at the beginning of a tournament, the station obtains an index value A from which the station determines probability values that are allocated thereto for various rounds of the tournament; and
    the station participates in a tournament if the index value A it has obtained lies in the interval $[1-1/Q_{moy}; 1[$ where $Q_{moy}$ is a mean data rate value estimated for all stations that emitted a packet during preceding tournaments.

6. A method according to claim 5, wherein when the station participates in a tournament, the station weights the index value (A) by the ratio ($Q_{moy}$) in the following manner:

$$A'=1-Q_{moy}(1-A)$$

where the weighted index value A' is used instead of the value A in order to determine probability values that are allocated to the station.

7. A method according to claim 5, wherein the index value used for a tournament is calculated as a function of an index value used for a preceding tournament.

8. A method according to claim 7, wherein the index value used for the next tournament is equal to:

$$A=A+(A_n^i-1)/Q_{moy}-1/Q_{cour}$$

if the station won the preceding tournament, or else $$A=A+(A_n^i-1)/Q_{moy}$$

where:
- $[A_n^i, A_n^{i+1}[$ is the interval corresponding to the sequence of values r(1) . . . r(k) allocated to the station winning the preceding tournament;
- $Q_{cour}$ is the data rate value with which the station is to transmit a packet during the next tournament; and
- $Q_{moy}$ is a mean data rate value estimated for all stations that have emitted a packet during preceding tournaments.

9. A method according to claim 5, wherein the index value used for a tournament is drawn at random in the interval of values $[1-1/Q_{cour}; 1[$, where $Q_{cour}$ is a normalized value of said determined data rate.

10. A data processor readable, non-transmissible recording medium having a program recorded thereon that includes program code instructions configured to execute a regulation method when the instructions are executed by a processor, the method comprising:
- regulating a transmission using a tournament mechanism by a station having at least one data packet to transmit at a determined data rate, via a wireless communications network, wherein regulating comprises:
- determining whether or not the station is participating in a tournament-based on a probability with which the station participates in a tournament, wherein the probability is a function of said determined data rate, said determined data rate being independent of transmission authorizations or prohibitions allocated to the station during any preceding tournament; and
- transmitting the at least one data packet by the station on the wireless communications network at the determined rate, upon determination that the station participates in the tournament and is authorized to transmit the at least one data packet.

11. A station comprising:
- a network access device configured to transmit at least one data packet at a determined data rate, via a wireless communications network, and
- a transmission management module configured to regulate a transmission by the network access device using a tournament mechanism, the transmission management module being configured to determine whether or not the station participates in a tournament, based on a probability with which the station participates in a tournament, the probability being a function of said determined data rate, said determined data rate being independent of transmission authorizations or prohibitions allocated to the station during any preceding tournament.

12. A station according to claim 11, wherein the probability with which the station participates in a tournament increases with an increase in said determined data rate.

13. A station to claim 11, wherein the probability is also a function of another parameter that is characteristic of said packet to transmit.

14. A station according to claim 11, wherein the probability with which the station participates in a tournament is equal to 1 when said determined rate is greater than a mean data rate value $Q_{moy}$ estimated for all stations that emitted a packet during preceding tournaments.

15. A station according to claim 11, wherein the station comprises means for:
- at the beginning of a tournament, obtaining an index value A from which the station determines probability values that are allocated thereto for various rounds of the tournament; and
- participating in a tournament if the index value A it has obtained lies in the interval $[1-1/Q_{moy}; 1[$ where $Q_{moy}$ is a mean data rate value estimated for all stations that emitted a packet during preceding tournaments.

16. A station according to claim 15, wherein the station comprises means for weighting, when the station participates in a tournament, weights the index value (A) by the ratio ($Q_{moy}$) in the following manner:

$$A'=1-Q_{moy}(1-A)$$

where the weighted index value A' is used instead of the value A in order to determine probability values that are allocated to the station.

17. A station according to claim 15, wherein the index value used for a tournament is calculated as a function of an index value used for a preceding tournament.

18. A station according to claim 17, wherein the index value used for the next tournament is equal to:

$$A=A+(A_n^i-1)/Q_{moy}-1/Q_{cour}$$

if the station won the preceding tournament, or else $$A=A+(A_n^i-1)/Q_{moy}$$

where:
- $A_n^i, A_n^{i+1}[$ is the interval corresponding to the sequence of values r(1) . . . r(k) allocated to the station winning the preceding tournament;
- $Q_{cour}$ is the data rate value with which the station is to transmit a packet during the next tournament; and
- $Q_{moy}$ is a mean data rate value estimated for all stations that have emitted a packet during preceding tournaments.

19. A station according to claim 15, wherein the index value used for a tournament is drawn at random in the interval of values $[1-1/Q_{cour}; 1[$, where $Q_{cour}$ is a normalized value of said determined data rate.

20. A regulation method comprising:
- regulating a transmission using a tournament mechanism by a station having at least one data packet to transmit at a determined data rate via a wireless communications network, wherein regulating comprises:
- determining, by the station, whether or not the station is participating in a tournament based on a probability with which the station participates in a tournament, wherein the probability is a function of said determined data rate;
- wherein the probability with which the station participates in a tournament is equal to 1 when said determined rate is greater than a mean data rate value estimated for all stations that emitted a packet during preceding tournaments; and transmitting the at least one data packet by the station on the wireless communications network at the determined rate, upon determination that the station participates in the tournament and is authorized to transmit the at least one data packet.

21. A regulation method comprising:

regulating a transmission using a tournament mechanism by a station having at least one data packet to transmit at a determined data rate via a wireless communications network, wherein regulating comprises:

determining, by the station, whether or not the station is participating in a tournament based on a probability with which the station participates in a tournament, wherein the probability is a function of said determined data rate;

wherein at the beginning of a tournament, the station obtains an index value from which the station determines probability values that are allocated thereto for various rounds of the tournament;

the station participating in the tournament if the index value the station has obtained lies in an interval which is function of a data rate value estimated for all stations that emitted a packet during preceding tournaments; and transmitting the at least one data packet by the station on the wireless communications network at the determined rate, upon determination that the station participates in the tournament and is authorized to transmit the at least one data packet.

* * * * *